(12) United States Patent
Macrae

(10) Patent No.: US 9,306,673 B1
(45) Date of Patent: Apr. 5, 2016

(54) TRANSMISSION OF MULTIPLE LINEAR SIGNALS ON A SAME FREQUENCY

(71) Applicant: Nigel Iain Stuart Macrae, Las Vegas, NV (US)

(72) Inventor: Nigel Iain Stuart Macrae, Las Vegas, NV (US)

(*) Notice: Subject to any disclaimer, the term of this patent is extended or adjusted under 35 U.S.C. 154(b) by 0 days.

(21) Appl. No.: 14/640,213

(22) Filed: Mar. 6, 2015

(51) Int. Cl.
    *H04K 1/10*     (2006.01)
    *H04B 10/532*     (2013.01)
    *H04B 7/10*     (2006.01)

(52) U.S. Cl.
    CPC .............. *H04B 10/532* (2013.01); *H04B 7/10* (2013.01)

(58) Field of Classification Search
    CPC ....... H01Q 21/24; H01Q 1/246; H01Q 1/243; H01Q 21/245; H01Q 21/293; H01Q 1/362; H01Q 21/205; H01Q 9/0428; H01Q 25/00; H01Q 21/06; H01Q 15/246; H01Q 19/028; H01Q 1/52; H01Q 1/523; H01Q 1/525; H04B 7/10; H04B 7/024; H04B 7/0465; H04B 7/0689; H04B 7/00; H04B 7/0404; H04B 10/532; H04L 1/0618; H04L 2025/03426; H04L 1/0656; H01P 1/161

USPC .......... 375/267, 295, 260, 299; 343/893, 824, 343/736, 724; 342/188, 363, 432
See application file for complete search history.

(56) References Cited

U.S. PATENT DOCUMENTS

| | | | | |
|---|---|---|---|---|
| 7,590,191 | B1 * | 9/2009 | Macrae | H04L 27/04 342/361 |
| 7,657,243 | B2 * | 2/2010 | Yoon | H01Q 1/2216 343/824 |
| 8,605,807 | B1 * | 12/2013 | Macrae | H04B 7/10 342/363 |

* cited by examiner

*Primary Examiner* — Rahel Guarino
(74) *Attorney, Agent, or Firm* — Ashok Tankha

(57) ABSTRACT

Disclosed is a method to transmit multiple linear electromagnetic signals on a same frequency. For N data signals Si, where i=1 through N, each data signal is transmitted at 180/N degrees rotation from the next. For each data signal Si, signals inverse to Si are transmitted at +180/N degrees and −180/N degrees from Si, rotated around the transmit axis, at a power level of 0.5/COS (180°/N) times the power of said Si signal. This results in cancellation of said data signal Si along the transmit rotation of Si and a receivable data signal inverted and at a 90 degrees rotation from said transmitted Si. A total of N distinct data signals are transmitted simultaneously on a same frequency, resulting in a dramatic increase in capacity in an electromagnetic system. N is an integer greater than one and could be, for example, 18.

11 Claims, 4 Drawing Sheets

R1=0°

S1 transmitted at
zero degree rotation
at P1 power

S1 inverse
transmitted at -Θ° at
Power =P1/ (2 ·
COS Θ)

S1 inverse
transmitted at +Θ° with
Power = P1/ (2 ·
COS Θ)

←————————————→ 90°

S1 inverted is received at
90° from transmitted S1. At
0° there is no S1 signal
receivable

N=6 R=30

$Si^{-1}$ indicates data signal transmitted inverse to signal Si, for i=1 to N

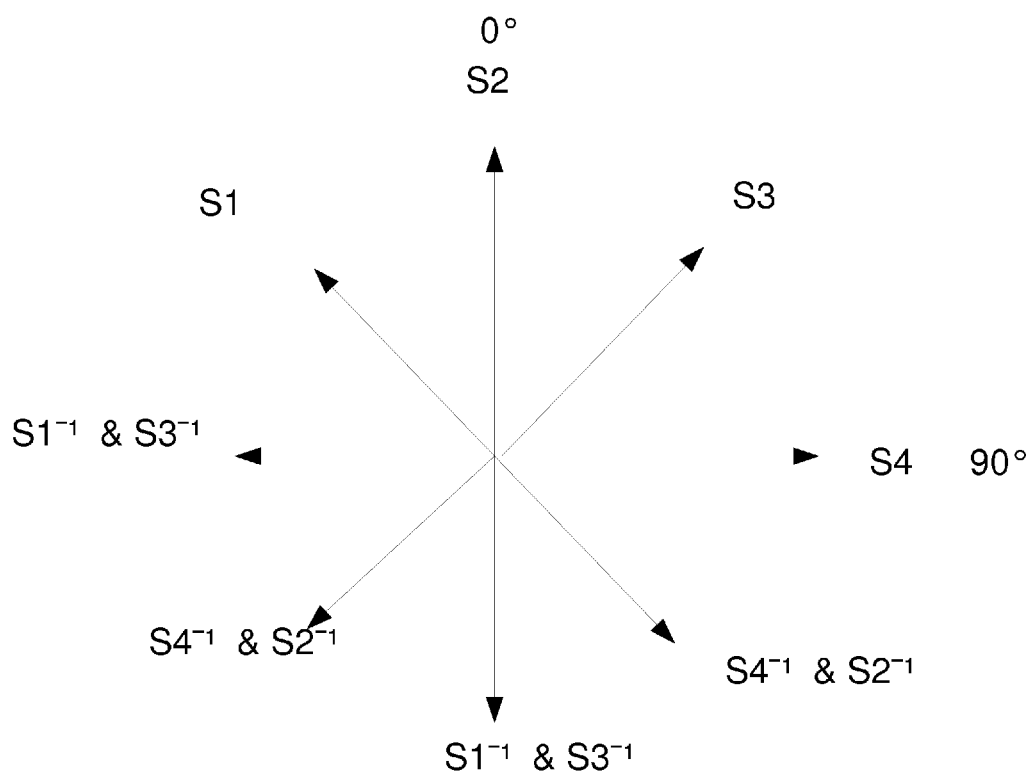

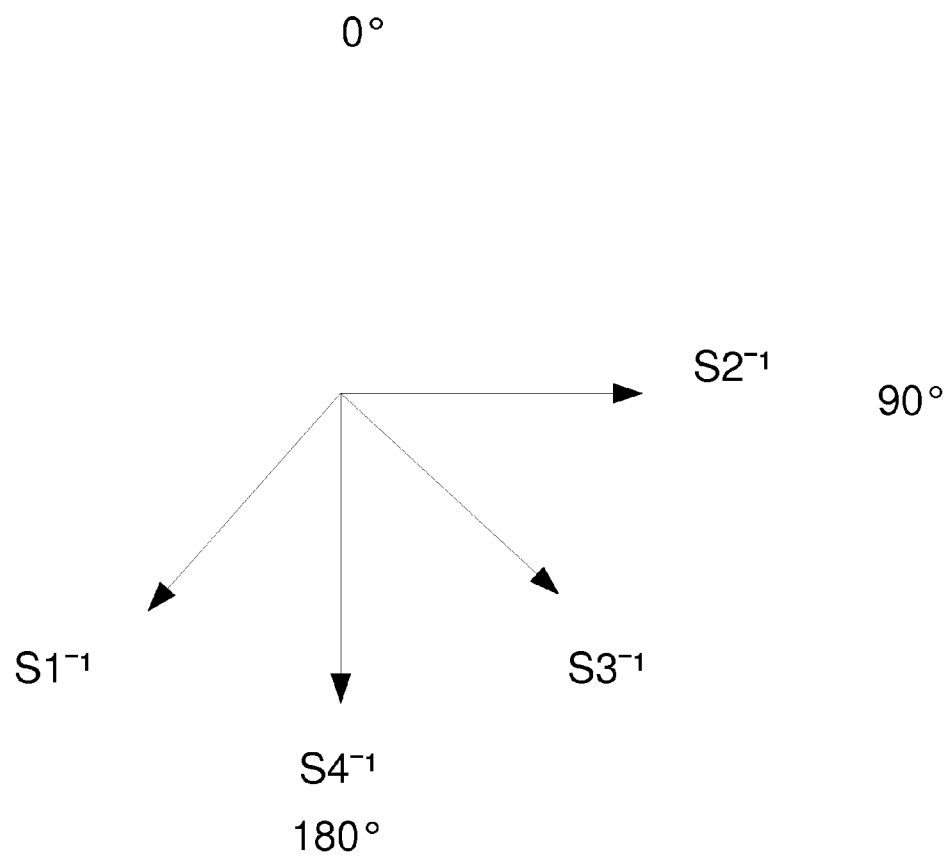

TRANSMISSION OF MULTIPLE LINEAR SIGNALS ON A SAME FREQUENCY

CROSS-REFERENCE TO RELATED APPLICATION(S)

None

BACKGROUND

The method and system disclosed herein, in general, relates to information communication. More specifically, the method and system disclosed herein relates to communicating multiple channels of distinct data, simultaneously, over a same frequency using linear polarized signals.

A "frequency band" is a continuum of frequencies usually defined by a higher frequency bound and a lower frequency bound. Typically electromagnetic signals carrying information occupy a narrow frequency band, sometimes also referred to as channels, but may occupy multiple channels or an extremely wide band. Two signals of the "same frequency" means that at least one of the frequencies in the frequency bands used to transmit said two data signals is the same for both signals, i.e., at least part of the band of frequencies overlaps. To be on a "same frequency", both data signals can occupy the same band or partially overlapping bands. The data signals can convey digital or analog information. As used herein, "data signal" refers to an electromagnetic signal modulated to carry information of any kind.

The "transmit axis" is a line between a transmitting antenna and a corresponding receive antenna. In this invention, multiple data signals and inverted data signals are transmitted at various rotations around the transmit axis.

Linear signals are typically transmitted in one of two rotations, vertical or zero degrees rotation, and horizontal representing an orthogonal, i.e. a 90°, rotation from the vertical around the transmit axis. If two different linear data signals are transmitted on a same frequency they do not interfere when they are transmitted orthogonally to each other. Since there are only two orthogonal linear polarizations, horizontal and vertical, generally the maximum number of signals that can be simultaneously transmitted on the same frequency is two. Transmission of two orthogonal signals on a same frequency is considered frequency reuse since two signals occupy the same frequency simultaneously. This disclosure describes a method to transmit three or more distinct data signals on a same frequency simultaneously resulting in an increase in capacity.

Another form of frequency reuse is through separation. Additional channels can be transmitted on the same frequency as long as there is sufficient distance between the transmitters so that antennas can pick up the selected transmissions with minimal interference. In the case of satellites, the satellites must maintain a distance of about two degrees of arc before the same frequencies can be reused. In the case of broadcast television, terrestrial microwave radios, and for commercial radio stations geographic distance of many miles is used to ensure sufficient attenuation between the transmitters.

Another form of reuse is directional separation caused by use of directional antennas. For example, one tower can hold several directional antennas each pointing in a different direction. Each antenna carries different data signals on the same frequencies. Because of the directionality of each antenna, only signals on the front side of the antenna can be received or picked up. This technique is often used in cell phone communications to accomplish frequency reuse, thereby increasing capacity in a cellular system.

A goal of signal engineering is to maximize the amount of signals carried on the same path and same frequency. This invention achieves this goal by increasing the capacity in any electromagnetic system using polarized waves. The transmission schemes of this disclosure apply to any frequency electromagnetic waves that can be polarized including, for example, light, microwave, and radio frequency waves.

Electromagnetic waves do not interact when transmitted through a non absorbing media such as space. Horizontal and vertical linearly polarized data signals do not modify each other once transmitted and pass through space without interacting. An antenna receives or essentially samples all transmissions passing through a particular point in space at a particular time.

When measuring power around the transmit axis of a single linear polarized signal the formula for off axis power is $P^1 = P \cdot COS\, \phi$ where P is the power of a specified signal transmitted linearly, $\phi$ is the absolute rotation of a receive linear feed in relationship to the rotation of the transmit linear feed, $P^1$ is the power at that angular rotation from the transmitted signal being measured. $P^1$ does not include propagation losses, but represents the received energy of a perfectly aligned receive antenna in relationship to a rotated receive antenna. The power of a linear signal at a rotation of 0 degrees is one, meaning no loss due to rotation, and at 90 degrees, i.e. orthogonal, is zero since COS 90 is 0.

A basic principle of electromagnetic waves is the principle of linear superposition: "when two or more waves are present simultaneously at the same place the resultant wave is the sum of the individual waves." *Physics $3^{rd}$ Edition* by Cutnell/Johnson, Wiley and Sons, 1995.ISBN 0-471-59773-2, page 521.

An inverse signal is a duplicate signal to a first signal, just 180° out of phase. Two inverse signals transmitted cancel each other at reception when they are received together and their amplitudes are equal, and partially cancel each other if there amplitudes are not equal. The disclosed method uses cancellation of inverse signals.

In this invention a first data signal is transmitted in a linear polarization. The signal is characterized by its rotation around the transmit axis (its polarization), by its path of propagation, by its bandwidth, by its power, and by its modulation.

This invention makes use of signals inverse to a first data signal, each transmitted on a side of, i.e. rotated from, said first transmitted data signal, said signals being exactly inverse to said first data signal and at a specified power level in relation to said first data signal. The power levels of the inverse signals are such that they cancel said first data signal at zero degrees rotation from said first data signal, resulting in the reception of an inverse first data signal at a 90 degree rotation from the transmitted first data signal.

An additional quantity of differing data signals are transmitted, rotated around the transmit axis by 180/N degrees, where N is a positive integer representing the total number of desired signals on the same frequency. Inverse signals to each data signal Si are transmitted at ±180/N or less degrees from each data signal Si where i varies from 1 to N.

SUMMARY OF THE INVENTION

This summary is provided to introduce a selection of concepts in a simplified form that are further described in the detailed description of the invention.

In a preferred embodiment a first data signal S1 is transmitted in a vertical polarization, that is, aligned to a zero degree rotation around the transmit axis. Two inverse signals to said first data signal are created. Said inverse signals are the same as said first data signal except they are 180 degrees out of phase with said first signal. These inverse data signals are transmitted at a same power level to each other, and at a same absolute rotation R around the transmit axis but on each side of S1. R=180°/N where N is the desired number of data signals to be transmitted. The transmit power of each inverted signal is set to 0.5 times the power level of S1 divided by COS R. The two side signals exactly cancel the first data signal S1 at zero degrees rotation. The result is the reception of an inverted signal at 90 degrees from said transmitted S1 and a canceled signal at zero degrees rotation from transmitted S1.

Additional differing data signals are transmitted at a power level $P_i$, for i=2 through N, in linear polarization at incrementally R degrees rotation around the transmit axis from S1 resulting in N unique data signals being simultaneously transmitted. For each additional data signal its inverse is transmitted at both +R° and −R° rotation from the alignment of said signal $S_i$, for i=2 through N. The transmit power of each inverted signal ($IPS_i$) is set to 0.5 times the power level of $S_i$ divided by COS R, that is, $IPS_i=(0.5 \times PS_i/COS\ R)$. The two inverse side signals exactly cancel the data signal $S_i$ at alignment with $S_i$. The result is the reception of an inverted signal receivable at 90 degrees from said transmitted $S_i$ and a canceled signal at zero degrees rotation from transmitted $S_i$. A total of N unique data signals are transmitted.

Using the above technique, capacity can be increased in any transmission medium that allows for transmission of polarized electromagnetic signals.

DESCRIPTION OF FIGURES

FIG. 4 shows the example of transmission of four unique data signals S1, S2, S3 and S4 at a 45° rotation from the next along with their transmitted inverse data signals $S1^{-1}$, $S2^{-1}$, $S3^{-1}$ and $S4^{-1}$.

FIG. 5 shows the rotation at reception of the differing transmitted data signals exemplified in FIG. 4.

DESCRIPTION

The purpose of this invention is to increase capacity in any communications system capable of transmitting and receiving polarized electromagnetic signals. The invention makes use of the fact that signals do not interfere with each other when propagated through a transmissible medium such as the atmosphere, the vacuum of space, or glass fiber. However, when multiple signals are received together in a medium where polarization is not maintained such as wire, the signals combine. When combined, inverse signals of different amplitudes partially cancel each other, and two inverse signals of equal amplitude completely cancel.

The discovery behind this invention is that when a linearly polarized signal, for example a first data signal S1, is transmitted at a rotation around the transmit axis of R1 degrees, and two or more signals inverse to S1 are transmitted rotated with at least one on each side of said first data signal S1 and at power levels such that that they cancel S1 at R1 degrees; the results are a receivable signal at R1+90° of S1 inverted, and the ability to transmit additional unique data signals rotated around the transmit axis on a same frequency.

Figures 1, 2:
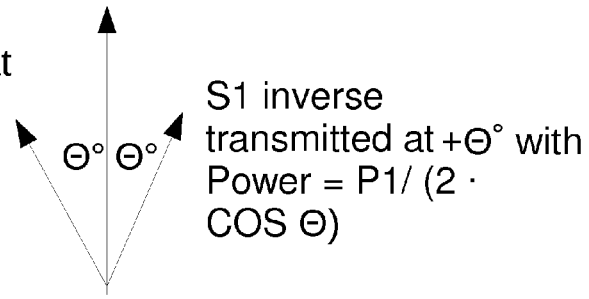
FIG. 1 shows the emission of a single data signal S1 and two inverse data signals that are identical to S1 except propagated 180° out of phase to S1 at +R° and −R° rotation.
FIG. 2 shows the received S1 signal. The receivable signal is rotated 90° from the transmitted S1 and is inverse to S1. S1 is transmitted in vertical polarization and received in horizontal polarization.

In a first configuration with S1 transmitted at, for example, 0 degrees rotation or vertically polarized, and in the configuration where N signals are to be simultaneously transmitted on a same frequency, the inverse signals are transmitted at plus and minus 180/N degrees rotation on either side of S1. In this configuration, one inverse signal on each side of S1 is transmitted. FIG. 1 demonstrates the data signal S1 along with transmission of said two signals inverse to S1, transmitted on each side of S1 at a rotation of +θ and −θ from S1, where θ=180°/N. The specified power level for each inverted signal is $0.5 \times P1/COS\ θ$, where P1 is the transmit power of S1. If the rotation of S1 is R1 these two side signals exactly cancel S1 from R1−90°+θ degrees through R1+90°−θ degrees. The resulting signal is strongest at R1+90°, see FIG. 2. At R1+90° a signal inverse to S1 is detectable. An inverse signal is one with a phase shift of 180°. Said phase shift has no effect on the reception and detection of the desired signal S1. However, there is a reduction in the power level corresponding to the number N. For example, when N is 6, θ is 180°/6 or 30°, and S1 is received at a level of 0.577 times the transmit level for S1 less all other transmission losses.

Figure 3:
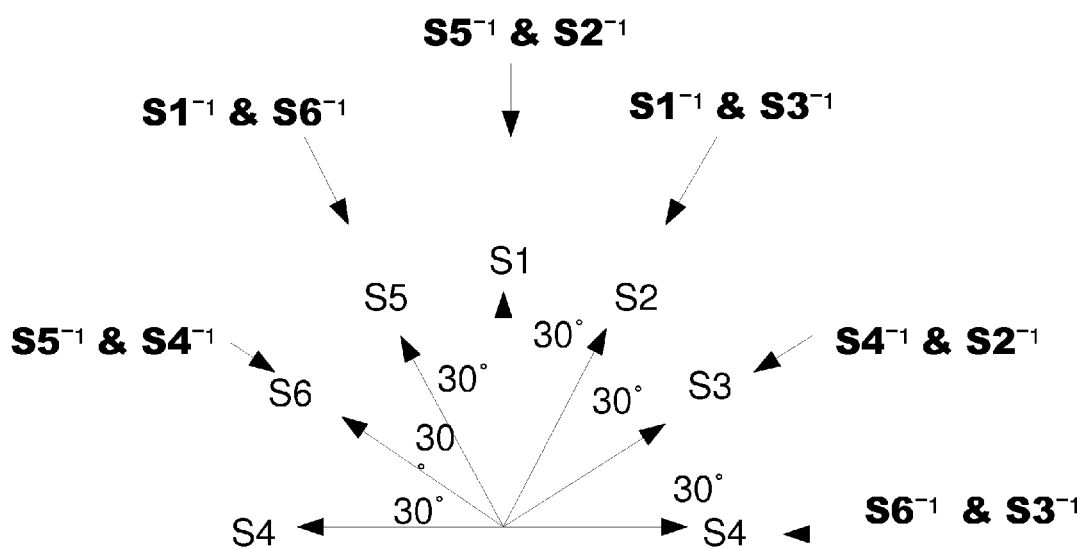
FIG. 3 shows the emission of 6 distinct data signals at 30° spacing. Each data signal is accompanied by inverse copies transmitted at plus and minus 30° rotation from its corresponding data signal.

As an example where N=6 and R=180/N=30°, different data signals S2 through S6 are each transmitted at a rotation of 30 degrees from the prior one. In FIG. 3 illustrating this example, S2 is transmitted at +30° from S1, S3 is transmitted at +60° from S1 and S4 is transmitted at +90° from S1, S5 is transmitted at −30° from S1 and S6 is transmitted at −60° from S1 for a total of six distinct signals. For each data signal $S_i$ where i=1 through 6, a signal inverse to $S_i$ is transmitted at +30° rotation from each data signal $S_i$ and at a −30° rotation from each data signal $S_i$. These inverted signals are transmitted at a power level of $IPS_i=0.5 \times PS_i/COS\ 30$ where $PS_i$ is the power level of each data signal $S_i$ and $IPS_i$ is the power level of said inverse to $S_i$ data signals transmitted at plus and minus 30° from $S_i$.

In another example, where N=4, four different data signals S1 through S4 are each transmitted at a rotation of 45 degrees from the prior one. In FIG. 4, illustrating this configuration, S2 is transmitted at +45° from S1, S3 is transmitted at +90° from S1 and S4 is transmitted at +135° from S1 for a total of four distinct signals. For each transmitted data signal $S_i$, where i=1 through 4, a signal inverse to $S_i$ is transmitted at +45° from each data signal $S_i$ and at -45° from each data signal $S_i$. These inverted signals are transmitted at a power level of $IPS_i=0.5 \times PS_i/COS\ 45=0.707 \cdot PS_i$ where $PS_i$ is the transmit power level of each data signal $S_i$ and $IPS_i$ is the power level of each inverse to $S_i$ data signal transmitted at +45° from $S_i$.

FIG. 5 indicates the receive orientations of the data signals S1 to S4 in the N=4 signals example of FIG. 4. Each data signal $S_i$ is received 90 degrees from the rotation of the corresponding transmitted signal $S_i$.

In other configurations more than one inverse signal can be transmitted on each side of a specified data signal $S_i$, but $PS_i$=the sum of the COS $θ_i \times IS_i$ where $IS_i$ represents the power level of each of the inverse $S_i$ signals and $θ_i$ is the rotation in degrees of the inverse $IS_i$ signal from data signal Si. The inverse signals need to be within 180/N degrees of the specific Si signal, where N is the number of unique data signals.

In the above configurations, the received signal appears at right angles to the transmit signal, i.e. a 90 degree rotation, and is inverse to the transmit signal, i.e. 180 degrees out of phase. Exclusive of the propagation loss, the received signal is at reduced power due to signal cancellation and angular rotation losses. This is dependent on the number R which, in the preferred configurations, is related to N by R=180/N. However, the rotation of the inverse signals could be less than R but an additional reduction in received power is the result. In the preferred configurations only two inverse signals are transmitted for each forward signal and are transmitted at ±R where R=180/N. Ignoring propagation losses the receive power reduction (Ploss) at a 90 degrees rotation from said transmitted Si can be estimated by Ploss=PSi−PSi·(COS 90−θi/COS θi) where PSi is the level of the transmitted data signal Si. In other words, PSi·(COS 90−θi/COS θi) is the power level of the signal received at 90 degrees rotation from the transmitted Si not including all other propagation losses. For example, where the number of different data signals is 12 then N=12 and R=15° and the power reduction of the received orthogonal signal compared to the transmitted Si signal is 1−cos 75/cos 15 which is 0.732×the power of the transmitted signal. In other words, only 0.268 of the transmitted Si is available in the link budget at the receive antenna before taking other loss factors into consideration.

In the example of N=4, the apparent loss is zero. (1−COS 45/COS 45=0). What is received at a 90 degree rotation from the transmitted signal Si is an inverse signal at the same power level as the transmitted signal Si. There is no received signal at a zero degree rotation from Si. The inverse signals to S1 are transmitted at 0.7071 the power of Si and at ±45 degrees from Si. This is found by assuming a unity power level, the power of the inverse signals Pinv are 0.5/COS 45°=0.7071 times the Si power level. Theses signals cancel Si at zero degrees and are received at ninety degrees at a level of COS 45°×2×0.7071 which=1. So the received power at 90° is the same as the transmitted power of Si at 0°, not including propagation losses.

For N=6, R=30°, the transmit level of each data signal inverted to each Si signal is 0.5/COS 30°=0.5774 times the power level of Si. The signal received at 90 degrees rotation from Si is 0.5774 of the transmit level of Si, but phase changed 180 degrees. In the link budget 0.4226 of the transmit power of Si is lost.

For N=12, R=15°, the transmit level of each data signal inverted to each Si signal is 0.5/COS 15°=0.5176 times the power level of Si. The signal received at 90 degrees rotation from Si is 0.27 of the transmit level of Si, but phase changed 180 degrees.

For N=18, R=10°, the level of each data signal inverted to each Si signal is 0.5/COS 10=0.5071 times the power level of Si. The signal received at 90 degrees rotation from Si is 0.176 of the transmit level of Si, but phase changed 180 degrees.

In all embodiments, the number of distinct signals is N. Each distinct data signal Si is transmitted at 180/N° (=R°) from the previous. The inverted signals to each Si are transmitted rotated by no more than +R or −R degrees from Si. The inverted signals cancel at reception for the entire range of 270+R° to 90−R° rotation from Si and appear inverted at ±90° from the transmit rotation of Si.

Transmitting multiple linear signals around the transmit axis as disclosed above can be used in mobile systems as well. In an embodiment where the receive antenna is moving in relation to the transmit antenna multiple receive antennas in rotation around the transmit axis are used to pick up said multiple data signals transmitted in any of the embodiments. The receive electronics subsequently examine all received signals and select for an antenna receiving the strongest desired signal. Since the receive antenna is in apparent motion to the transmit antennas, switching between receive signals can occur rapidly so that a strong receive signal containing the desired data signal can be selected and decoded in each moment. This could be useful in cellular telephone systems where much of the data is sent from the base station to the mobile station with a much smaller return loading. Multiple data signals using the disclosed method are transmitted from a base station. A receive handset with multiple receive antennas receives an array of signals around the transmit axis and selects the desired signal received on said multiple antennas using such methods as signal to noise ratio comparisons or signal strength comparisons, and then further processes said selected signal to recover the desired data. This is similar to the current technology where the cell phone handsets select between cell sites for the strongest signal.

I claim:

1. A method comprising:
    transmitting a linear polarized data signal, designated by S1;
    transmitting an inverse data signal of said linear polarized data signal S1,
    designated by $S1^{-1}$, at θ degrees axial rotation around a transmit axis of said linear polarized data signal S1; and
    transmitting another inverse data signal of said linear polarized data signal S1, designated by $S1^{-2}$, at −θ degrees axial rotation around said transmit axis of said linear polarized data signal S1, wherein θ=180/N degrees, wherein said N is a finite positive integer representing a maximum number of unique data signals transmitted at a same frequency including said linear polarized signal S1, wherein
    transmit power levels of said inverse data signal $S1^{-1}$ and said inverse data signal $S1^{-2}$ are set such that transmit power level of said linear polarized signal S1 is equal to sum of transmit power level of said inverse data signal $S1^{-1}$ times Cos θ plus transmit power level of said inverse data signal $S1^{-2}$ times Cos θ.

2. The method of claim 1, wherein said inverse data signal $S1^{-1}$ and said inverse data signal $S1^{-2}$ are both transmitted at same power level.

3. The method of claim 1, wherein said inverse data signal $S1^{-1}$ and said inverse data signal $S1^{-2}$ are both transmitted at same absolute rotation around said transmit axis of said linear polarized signal S1, with opposite rotations around said transmit axis of said linear polarized signal S1.

4. The method of claim 1, further comprising transmitting of a plurality of additional unique data signals Si along with said linear polarized signal S1, around the transmit axis of said linear polarized signal S1, wherein i ranges from 2 to N, wherein said plurality of additional unique data signals are transmitted at (i−1) times θ degrees rotation around said transmit axis of said linear polarized signal S1, wherein transmission of each of said additional unique data signals Si is accompanied by transmission of two inverse to Si data signals located at +θ degrees and −θ degrees rotation around a transmit axis of a corresponding unique data signal Si.

5. The method of claim 4, wherein transmit power level of each of said additional unique data signals Si is set equal to sum of transmit power levels of corresponding inverse data signals multiplied by cosine of angle of rotation θ between said corresponding inverse data signal and said corresponding unique data signal, resulting in cancellation of said additional unique data signals Si at receive stations aligned with said additional unique data signals Si, and further resulting in an inverted additional unique data signals Si being receivable orthogonally to said transmitted signal Si at said receive stations.

6. The method of claim 4, wherein each of said additional unique data signals Si is received by an antenna aligned orthogonally to transmit axis of each of said additional unique data signals Si.

7. The method of claim 4, wherein multiple receive antennas with differing rotations around the transmit axis of said linear polarized data signal S1 and transmit axis of each of said additional unique data signals Si are used to receive said linear polarized data signal S1 and said plurality of additional unique data signals Si, and wherein a method is provided to select one additional unique data signal from amongst S1 or said received plurality of additional unique data signals Si that has a preferred signal strength.

8. A method of transmitting a plurality of additional unique data signals Si along with a linear polarized data signal S1 on a same frequency, around a transmit axis of said linear polarized data signal S1, wherein total number of said additional unique data signals transmitted plus said linear polarized data signal S1 is N, wherein N is a finite positive integer, wherein i is a finite positive integer ranging from 2 to N, wherein said plurality of additional unique data signals Si are transmitted with a (i−1) times 180/N degree rotation around said transmit axis of said linear polarized data signal S1, wherein transmission of said linear polarized data signal S1 is accompanied by at least a pair of data signals inverse to data signal S1 and transmission of each of said plurality of additional unique data signals Si is accompanied by at least a pair of data signals inverse to data signal Si, wherein one of said pair of inverse data signals of said linear polarized data signal S1 is located within plus 180/N degrees rotation around said transmit axis of said linear polarized data signal S1, wherein other of said pair of inverse data signals of said linear polarized data signal S1 is located within minus 180/N degrees rotation around said transmit axis of said linear polarized data signal S1, wherein one of said pair of inverse data signals of each of said additional unique data signals Si is located within plus 180/N degrees rotation around a transmit axis of a corresponding additional unique data signal Si, wherein other of said pair of inverse data signals of said additional unique data signals Si is located within minus 180/N degrees rotation around said transmit axis of said corresponding additional unique data signal Si, wherein transmit power level of said linear polarized data signal S1 is set equal to sum of transmit power levels of said inverse data signals of said linear polarized data signal S1 times cosine of angle between said rotation of said linear polarized data signal S1 and rotation of each corresponding inverse data signal of said linear polarized data signal S1, and wherein transmit power level of each of said additional unique data signals Si is set equal to sum of transmit power level of each of corresponding inverse to Si data signal times cosine of angle between transmit axis of said unique data signal Si and each corresponding inverse data signal of said unique data signals Si.

9. The method of claim 8, wherein said linear polarized data signal S1 is received by an antenna aligned orthogonally to said transmit axis of said linear polarized data signal S1, and each of said additional unique data signals Si is received by an antenna aligned orthogonally to transmit axis of each of said additional unique data signal Si.

10. The method of claim 8, wherein said inverse data signals of said linear polarized data signal S1 is transmitted in a pair, wherein one inverse data signal in each pair is rotated on one side of said linear polarized data signal S1, wherein another inverse data signal in each pair is rotated symmetrically on opposite side of said linear polarized data signal S1, wherein said inverse data signals of each of said additional unique data signals Si are also transmitted in pairs, wherein one inverse data signal in each pair is rotated on one side of said corresponding additional unique data signal, and wherein other inverse data signal in each pair is rotated symmetrically on opposite side of said corresponding additional unique data signal.

11. The method of claim 8, wherein multiple receive antennas with differing rotations around the transmit axis of said linear polarized data signal S1 and transmit axis of each of said additional unique data signals Si are used to receive said linear polarized data signal S1 and said plurality of additional unique data signals Si, and wherein a method is provided to select one additional unique data signal from amongst the received plurality of additional unique data signals Si that has a preferred signal strength.

* * * * *